(12) United States Patent
Ohbitsu

(10) Patent No.: US 9,996,215 B2
(45) Date of Patent: Jun. 12, 2018

(54) INPUT DEVICE, DISPLAY CONTROL METHOD, AND INTEGRATED CIRCUIT DEVICE

(71) Applicant: FUJITSU LIMITED, Kawasaki-shi, Kanagawa (JP)

(72) Inventor: Toshiro Ohbitsu, Akishima (JP)

(73) Assignee: FUJITSU LIMITED, Kawasaki (JP)

( * ) Notice: Subject to any disclaimer, the term of this patent is extended or adjusted under 35 U.S.C. 154(b) by 639 days.

(21) Appl. No.: 14/574,180

(22) Filed: Dec. 17, 2014

(65) Prior Publication Data

US 2015/0205486 A1   Jul. 23, 2015

(30) Foreign Application Priority Data

Jan. 17, 2014 (JP) ................... 2014-006999

(51) Int. Cl.

| G06F 3/048 | (2013.01) |
| --- | --- |
| G06F 3/0481 | (2013.01) |
| G06F 3/041 | (2006.01) |
| G06F 3/0488 | (2013.01) |
| G06F 3/0484 | (2013.01) |

(52) U.S. Cl.
CPC ........ *G06F 3/04817* (2013.01); *G06F 3/0416* (2013.01); *G06F 3/0488* (2013.01); *G06F 3/04842* (2013.01); *G06F 2203/04106* (2013.01); *G06F 2203/04806* (2013.01)

(58) Field of Classification Search
CPC . G06F 2203/04106; G06F 2203/04806; G06F 3/0416; G06F 3/04817; G06F 3/04842; G06F 3/0488
See application file for complete search history.

(56) References Cited

U.S. PATENT DOCUMENTS

| 6,073,036 | A | * | 6/2000 | Heikkinen | .......... | G06F 3/04842 |
| | | | | | | 379/354 |
| 2010/0289764 | A1 | | 11/2010 | Akabe et al. | | |
| 2011/0018827 | A1 | * | 1/2011 | Wang | ................... | G06F 3/0482 |
| | | | | | | 345/173 |
| 2011/0074671 | A1 | | 3/2011 | Shimosato et al. | | |
| 2013/0181924 | A1 | * | 7/2013 | Hong | ................... | G06F 3/0412 |
| | | | | | | 345/173 |

FOREIGN PATENT DOCUMENTS

| JP | 2006-331092 A | 12/2006 |
| --- | --- | --- |
| JP | 2010-009575 A | 1/2010 |
| JP | 2010-266997 A | 11/2010 |
| JP | 2011-028560 | 2/2011 |

* cited by examiner

*Primary Examiner* — Thanh Vu
(74) *Attorney, Agent, or Firm* — Maschoff Brennan

(57) ABSTRACT

An input device including a display screen and a touch panel disposed on the display screen and a plurality of elements to be selected in the display screen by the touch panel, the input device includes a memory, a processor coupled to the memory, configured to recognize a contact body shape on the touch panel, put into non-display an element hidden by the contact body shape from among the plurality of elements to be selected in the display screen when the contact body shape is recognized as a specific shape, zoom-display an element to be selected different from the element put into non-display from among the plurality of elements to be selected, using an original region of the element to be selected put into non-display.

16 Claims, 15 Drawing Sheets

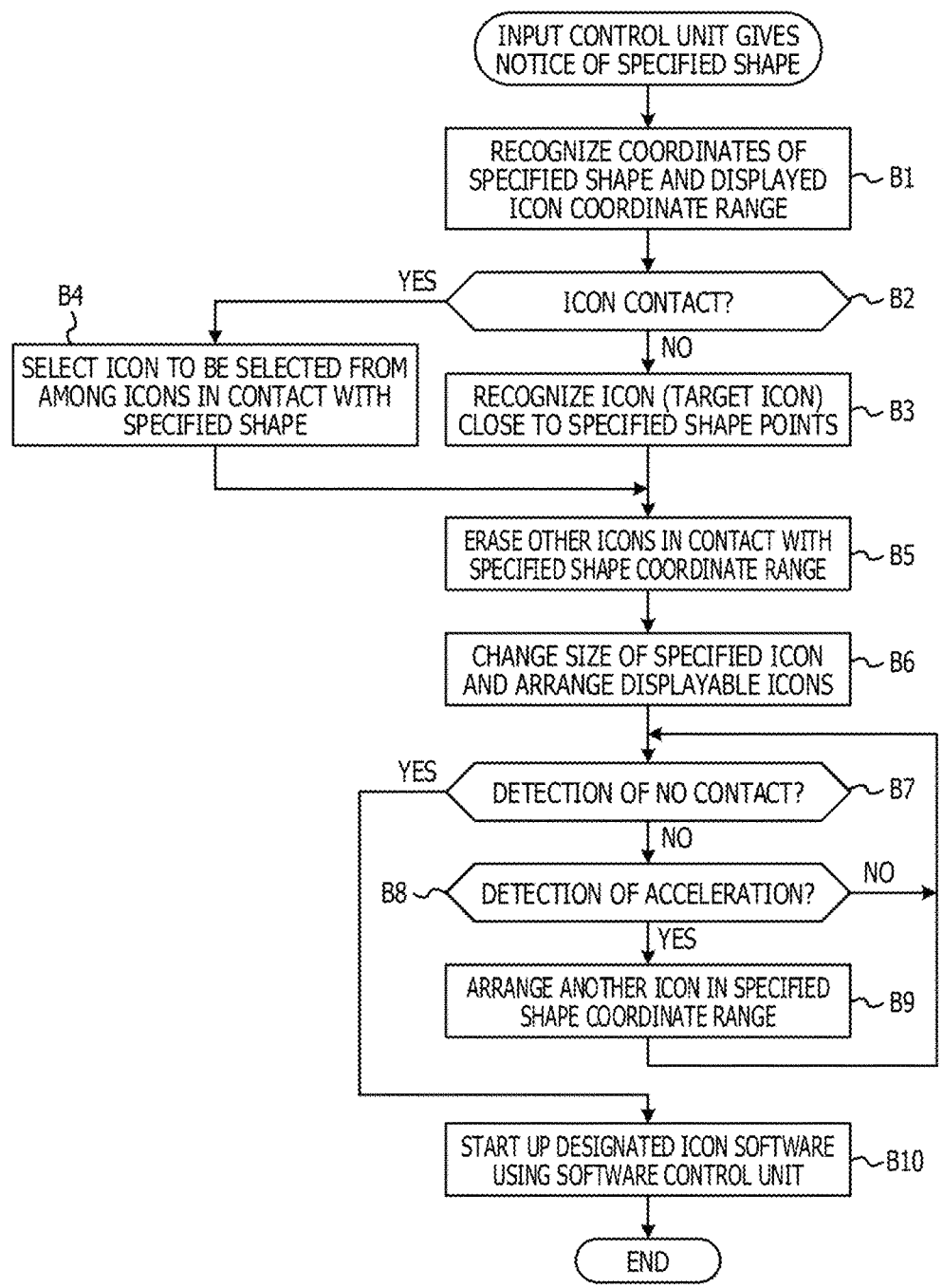

INPUT DEVICE, DISPLAY CONTROL METHOD, AND INTEGRATED CIRCUIT DEVICE

CROSS-REFERENCE TO RELATED APPLICATION

This application is based upon and claims the benefit of priority of the prior Japanese Patent Application No. 2014-006999, filed on Jan. 17, 2014, the entire contents of which are incorporated herein by reference.

FIELD

The embodiments discussed herein are related to an input device, a display control method, and an integrated circuit device.

BACKGROUND

In recent years, mobile terminal devices equipped with touch panels, such as smartphones (multifunctional mobile phones) and tablet type mobile terminal devices, have prevailed. In such a mobile terminal device (hereinafter, referred to as a touch panel terminal) equipped with a touch panel, in general, by touching an icon, a button, or the like displayed on the display screen thereof with a finger, a user performs an operation.

Since, for example, the tablet type mobile terminal device is a mobile terminal based on a premise of being carried, the display screen size thereof is, for example, about 10 inches, and a plurality of operation icons or operation buttons are lined up in the display screen of this size. These techniques have been disclosed in, for example, Japanese Laid-open Patent Publication No. 2010-266997.

SUMMARY

According to an aspect of the invention, an input device including a display screen and a touch panel disposed on the display screen and a plurality of elements to be selected in the display screen by the touch panel, the input device includes a memory, a processor coupled to the memory, configured to recognize a contact body shape on the touch panel, put into non-display an element hidden by the contact body shape from among the plurality of elements to be selected in the display screen when the contact body shape is recognized as a specific shape, zoom-display an element to be selected different from the element put into non-display from among the plurality of elements to be selected, using an original region of the element to be selected put into non-display.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a flowchart explaining a flow processed by a display operation processing unit in the information processing device as an example of the embodiment.

DESCRIPTION OF EMBODIMENTS

Figure 1:
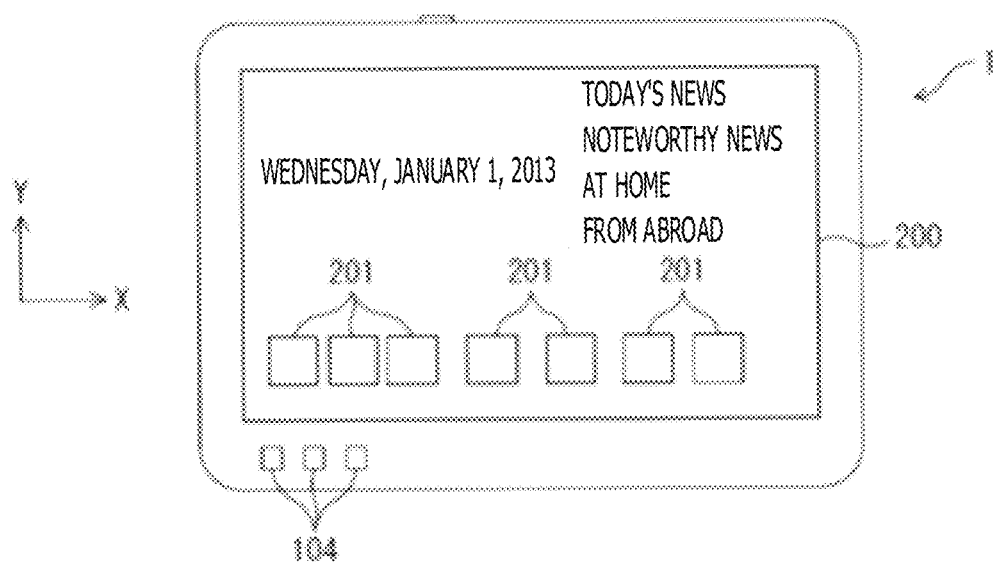
FIG. 1 is a diagram exemplifying an external appearance of an information processing device as an example of an embodiment.

In a touch panel terminal of the related art, in a case where an input operation (a touch or a tap) is performed on an icon or an operation button, arranged on a display screen, there has been a problem that an erroneous operation of simultaneously touching an adjacent icon or operation button occurs and this easily causes an unwanted operation.

In addition, the touch panel terminal is able to be carried, as described above. Therefore, in many cases, while holding the touch panel terminal with one hand, a user operates these icons or operation buttons using the thumb of the hand holding this touch panel terminal. For example, in a train or a bus, in a state of hanging on to a strap with one hand, holding of the touch panel terminal and an operation thereon are performed with the other hand.

In such a case, an erroneous operation of simultaneously touching a plurality of icons with the thumb of the hand holding the terminal, and this easily causes an unwanted operation.

Hereinafter, embodiments of the present input device, display control method, program, and integrated circuit device will be described with reference to drawings. In this regard, however, the following embodiments are just exemplifications, and there is no intention to exclude various examples of modifications or various applications of a technology, not illustrated in the embodiments. In other words, the present embodiments may be variously modified and implemented without departing from the scope thereof. In addition, each drawing does not have a purpose of only including configuration elements illustrated in the drawing, and may include another function and so forth. In addition, some of configuration elements illustrated in the drawings may be omitted.

Figure 2:
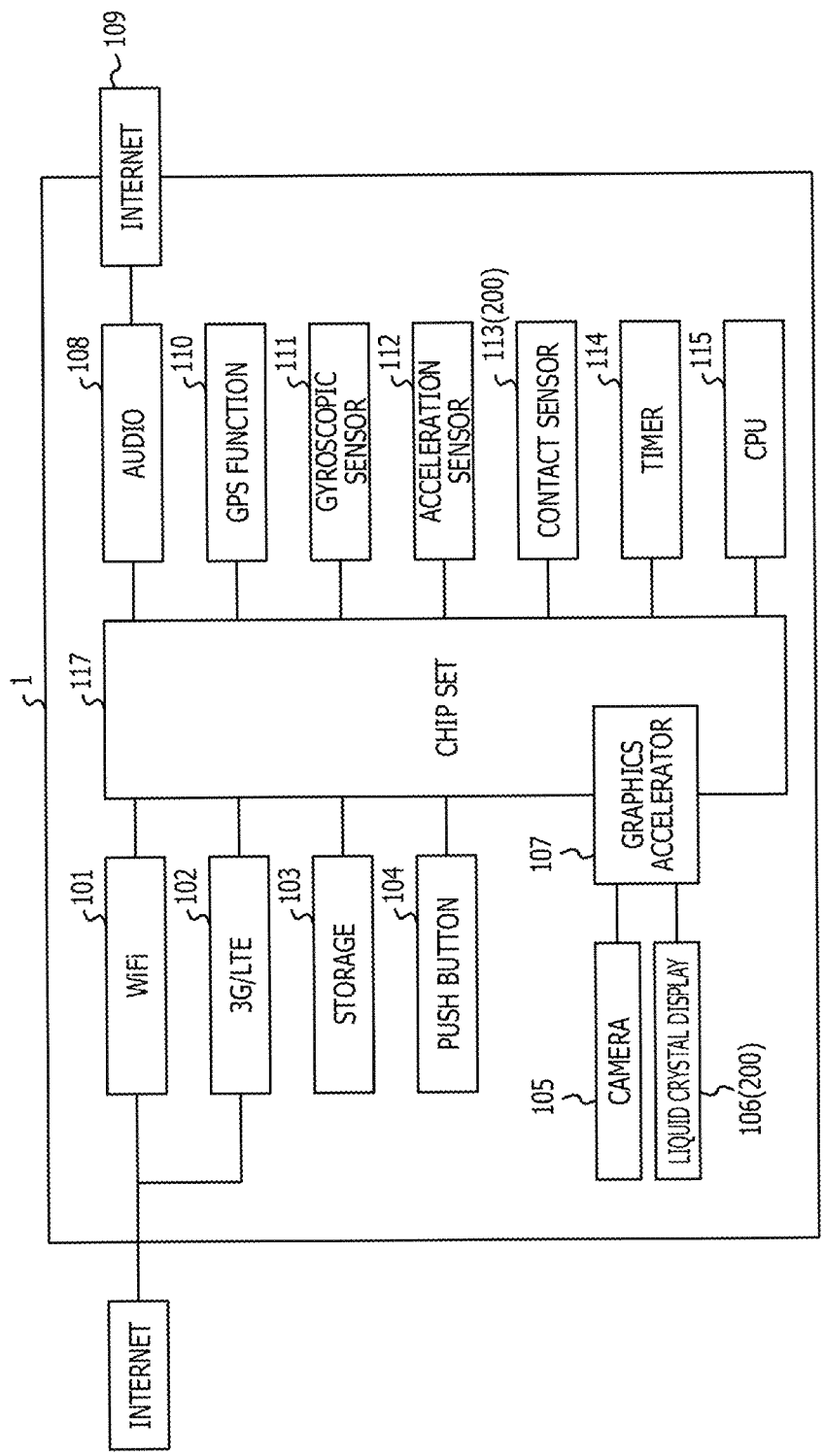
FIG. 2 is a diagram schematically illustrating a hardware configuration of the information processing device as an example of the embodiment.
Figure 3:
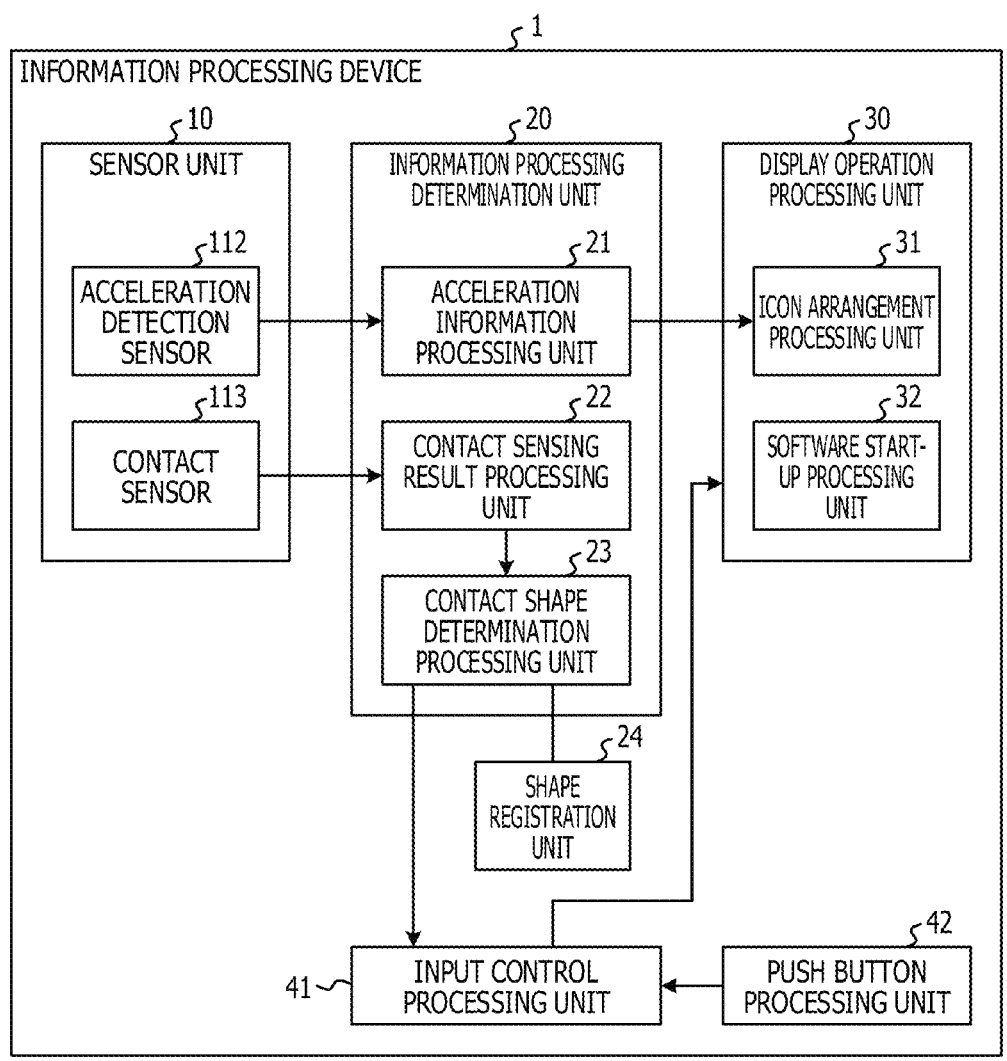
FIG. 3 is a diagram schematically illustrating a functional configuration of the information processing device as an example of the embodiment.

FIG. 1 is a diagram exemplifying the external appearance of an information processing device 1 as an example of an embodiment, FIG. 2 is a diagram schematically illustrating the hardware configuration thereof, and FIG. 3 is a diagram schematically illustrating the functional configuration thereof.

The present information processing device 1 is a computer, a personal digital assistant (PDA), a mobile phone, or the like, and is able to display, in a touch panel 200, various kinds of information such as icons 201, as exemplified in FIG. 1. In addition, through this touch panel 200, an operator is able to perform various types of input operation. In addition, the present information processing device 1 is configured as a mobile terminal able to be carried by a user.

As illustrated in FIG. 2, the present information processing device 1 includes a Wireless Fidelity (WiFi) communication module 101, a 3rd generation (3G)/long term evolution (LTE) communication module 102, a storage 103, push buttons 104, a camera 105, a liquid crystal display 106, a graphics accelerator 107, an audio module 108, a microphone 109, a global positioning system (GPS) module 110, a gyroscopic sensor 111, an acceleration sensor 112, a contact sensor 113, a timer 114, a CPU 115, and a chipset 117.

The WiFi communication module 101 is a wireless communication adaptor that performs wireless communication in accordance with a WiFi standard, and the 3G/LTE communication module 102 is a wireless communication adaptor that performs wireless communication in accordance with a standard of 3G or LTE. Through the WiFi communication module 101 and the 3G/LTE communication module 102, the present information processing device is connected to Internet so as to be able to perform communication.

The storage 103 is a storage device that stores therein various kinds of data and programs used by the CPU 115 described below to perform various types of control and arithmetic operation. In addition, the storage 103 stores therein a result of an arithmetic operation performed by the CPU 115. The storage 103 is, for example, a random access memory (RAM), a read only memory (ROM), a hard disk drive (HDD), a solid state drive (SSD), or the like.

A program on this storage 103 is arbitrarily read into the CPU 115 and executed. In addition, the storage 103 is also used by the CPU 115 as a primary recording memory or a working memory. Furthermore, in the storage 103, a shape master (specified shape) described later using FIG. 8 and so forth is stored, and the storage 103 functions as a shape registration unit 24 illustrated in FIG. 3.

The push buttons 104 are push-button switches, and are provided as, for example, a power switch, a volume switch, and so forth. The camera 105 is an imaging device capable of imaging a moving image and a still image. This camera 105 is used as, for example, a web camera.

The graphics accelerator 107 performs drawing processing for causing the liquid crystal display 106 to display an image, and the CPU 115 or the like speeds up a graphics display function for causing the liquid crystal display 106 to display an image.

The audio module 108 controls inputting and outputting of sounds. The microphone 109 for inputting sounds and a speaker not illustrated are connected to this audio module 108.

The GPS module 110 receives a signal from a GPS satellite overhead, and performs positioning. The timer 114 performs timing. The chipset 117 includes a bus function, and connects individual units so that the individual units are able to perform communication with one another.

The gyroscopic sensor 111 detects an angular velocity used for motion sensing and so forth, and acquires, for example, information of the tilt or the like of the present information processing device 1. The acceleration sensor 112 is an inertial sensor aimed at measurement of acceleration, and acquires various kinds of information such as the movement, vibration, and shock of the present information processing device 1.

The gyroscopic sensor 111 and acceleration sensor 112 and the contact sensor 113 described later function as a sensor unit 10 in the present information processing device 1. In addition, in FIG. 3, for the sake of convenience, the illustration of the gyroscopic sensor 111 in the sensor unit 10 is omitted.

The liquid crystal display 106 is a display device that displays various kinds of information for the user. The contact sensor 113 is a position input device, and senses a position touched by an operation body (contact body) such as a finger or a stylus, on the liquid crystal display 106. In other words, the touch panel 200 is configured by the liquid crystal display 106 and the contact sensor 113.

In addition, by including, for example, a plurality of sensors (sensor group), the contact sensor 113 is able to simultaneously detect a plurality of contact points on the liquid crystal display 106. In addition, in a case where contacts on a plurality of positions are simultaneously performed by the operation body (for example, a finger of the user), the contact sensor 113 is able to detect these individual positions. The contact sensor 113 notifies a contact shape determination processing unit 23 described later of the sensing result thereof as contact sensing information.

Figure 4:
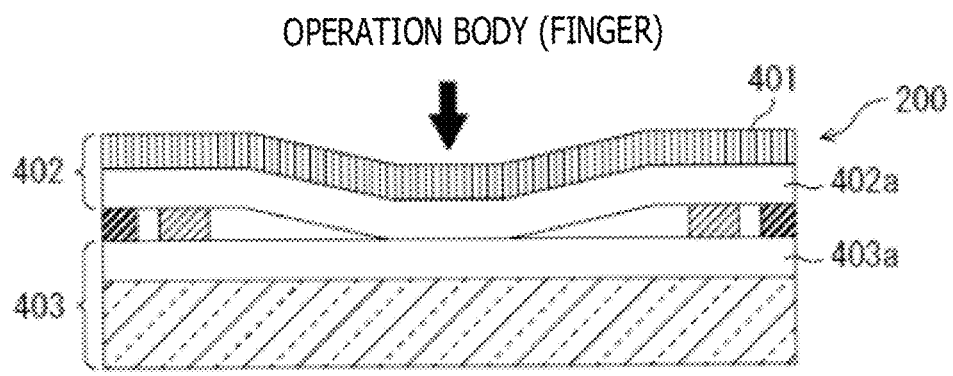
FIG. 4 is a diagram exemplifying a configuration of a touch panel.
Figure 5:
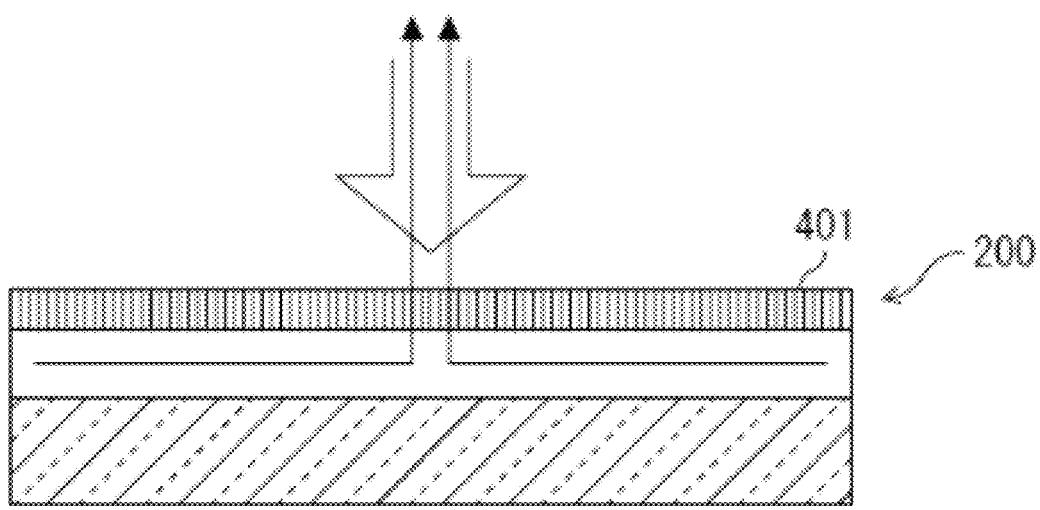
FIG. 5 is a diagram exemplifying a configuration of the touch panel.

FIG. 4 and FIG. 5 are diagrams each schematically exemplifying the configuration of the touch panel 200, FIG. 4 is the cross-sectional side view of the touch panel 200 of a resistive film type, and FIG. 5 is the cross-sectional side view of the touch panel 200 of an electrostatic capacitance type.

The resistive film type touch panel 200 illustrated in FIG. 4 includes a glass surface 403 in which a transparent electrode film 403a is arranged, and a film surface 402 in which a transparent electrode film 402a. If the surface 401 of the film surface 402 is pressed (pressure is applied thereto), the electrodes 402a and 403a of the film surface 402 and the glass surface 403, respectively, are in contact with each other, electricity flows, and the coordinates of the pressing position (contact position) are detected by sensing the fluctuation of the voltage thereof.

Since usually this resistive film type touch panel 200 has a structure in which the contacts thereof are provided at regular intervals, it is possible to sense the shape of the operation body by sensing the contacts, as described later.

In the touch panel 200 based on an electrostatic capacitance method illustrated in FIG. 5, by sensing, using a sensor, a change in a small amount of current (electrostatic capacitance) generated when the operation body (a fingertip or the like) touches the surface 401, the touched coordinates are detected. In the touch panel 200 based on this electrostatic capacitance method, by adopting a structure capable of detecting a number of sensed coordinates, it is possible to sense the shape of the operation body.

The CPU 115 is a processor that performs various types of control and arithmetic operation, and realizes various functions by executing an operating system (OS) and programs, stored in the storage 103. In other words, by executing a display control program, the CPU 115 functions as an information processing determination unit 20, a display operation processing unit 30, an input control processing unit 41, and a push button processing unit 42, illustrated in FIG. 3.

In addition, the program (display control program) used for realizing functions as the information processing determination unit 20, the display operation processing unit 30, the input control processing unit 41, and the push button processing unit 42 is provided in a form of being recorded in a computer-readable recording medium such as, for example, a flexible disk, CD (CD-ROM, CD-R, CD-RW, or the like), DVD (DVD-ROM, DVD-RAM, DVD-R, DVD+R, DVD-RW, DVD+RW, HD DVD, or the like), a Blu-ray disc, a magnetic disk, an optical disk, or a magnet-optical disk. In addition, the program is read from the recording medium, transferred to an internal recording device or an external recording device, stored therein, and executed by a computer. In addition, the program may be recorded in a recording device (recording medium) such as, for example, a magnetic disk, an optical disk, or a magnet-optical disk in advance, and may be provided from the recording device to the computer through a communication path.

To realize the functions as the information processing determination unit 20, the display operation processing unit 30, the input control processing unit 41, and the push button processing unit 42, the program stored in the internal recording device (the storage 103 in the present embodiment) is executed by a microprocessor in the computer (the CPU 115 in the present embodiment). At this time, the computer may read and execute the program recorded in the recording medium.

The display control program is executed after the OS is started up subsequent to, for example, the power activation of the present information processing device 1.

In addition, the individual functions as the information processing determination unit 20, the display operation processing unit 30, the input control processing unit 41, and the push button processing unit 42, described above, may be realized as an integrated circuit device (display control chip) equipped with the individual functions, instead of being realized by the execution of the program by the computer.

The push button processing unit 42 senses inputs from the push buttons 104, and notifies the input control processing unit 41 of the inputs.

The information processing determination unit 20 is a unit that processes information input from the sensor unit 10, and as illustrated in FIG. 3, the information processing determination unit 20 includes functions as an acceleration information processing unit 21, a contact sensing result processing unit 22, and the contact shape determination processing unit 23.

Based on a signal from the acceleration sensor 112, the acceleration information processing unit (acceleration direction sensing unit) 21 senses an acceleration direction applied to the present information processing device 1.

In the example illustrated in FIG. 1, it is assumed that a longitudinal direction (a horizontal direction in the drawing) of the rectangular touch panel 200 is an X-axis direction, a right side is a plus side, and a left side is a minus side. In the same way, it is assumed that a lateral direction (a vertical direction in the drawing) of the touch panel 200 is a Y-axis direction, an upper side is a plus side, and a lower side is a minus side. In addition, it is assumed that a direction perpendicular to the X-axis and the Y-axis is a Z-axis direction, the near side of the plane of paper is a plus side, and the far side of the plane of paper is a minus side.

In a case of sensing acceleration greater than or equal to, for example, a preliminarily set threshold value in one of individual axis directions of X, Y, and Z or a direction composed of the individual axis directions of X, Y, and Z, the acceleration information processing unit 21 senses the movement of the present information processing device 1. Hereinafter, in the present embodiment, for the sake of convenience, it is assumed that the acceleration information processing unit 21 senses acceleration in the X-axis direction or the Y-axis direction. In other words, based on the X-axis direction component and the Y-axis direction component of a sensed acceleration direction, the acceleration direction is determined.

Upon sensing acceleration greater than or equal to the threshold value in the X-axis direction or the Y-axis direction, the acceleration information processing unit 21 notifies an icon arrangement processing unit 31 in the display operation processing unit 30 of a sensed movement direction (acceleration direction) along with information to the effect that the acceleration is sensed.

The contact sensing result processing unit 22 receives contact sensing information given notice of by the contact sensor 113, converts the contact sensing information into position information (coordinate information) on the liquid crystal display 106 (touch panel 200), and notifies the contact shape determination processing unit 23 of the position information (coordinate information). In other words, the contact sensing result processing unit 22 performs processing for converting a sensing result based on the contact sensor 113 into information processable by the contact shape determination processing unit 23.

Based on the coordinate information given notice of by the contact sensing result processing unit 22, the contact shape determination processing unit (recognition unit) 23 recognize a contact body shape (operation body shape) in the touch panel 200.

Figure 6:
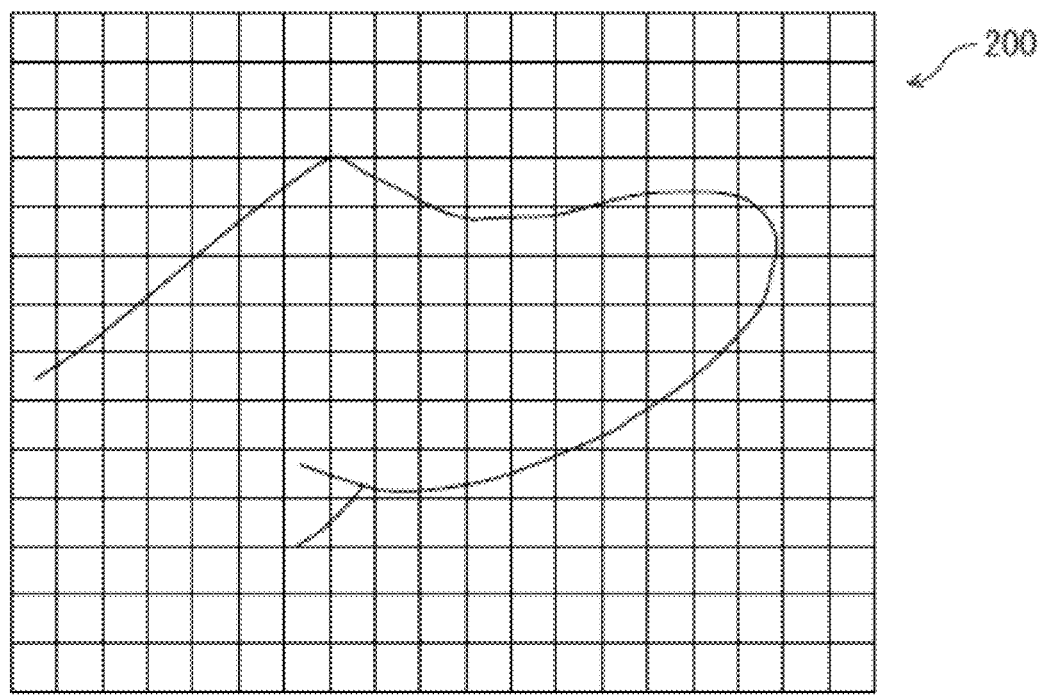
FIG. 6 is a diagram exemplifying a shape of an operation body on the touch panel of the information processing device as an example of the embodiment.
Figure 7:
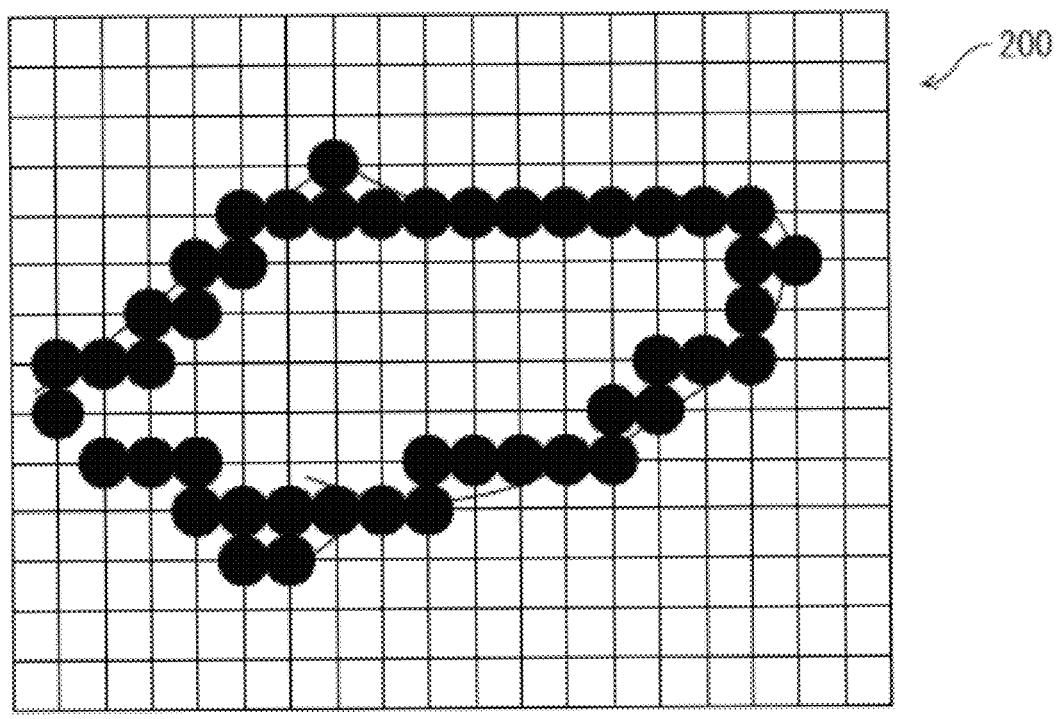
FIG. 7 is a diagram exemplifying a recognition result based on a contact shape determination processing unit with respect to the operation body illustrated in FIG. 6.
Figure 8:
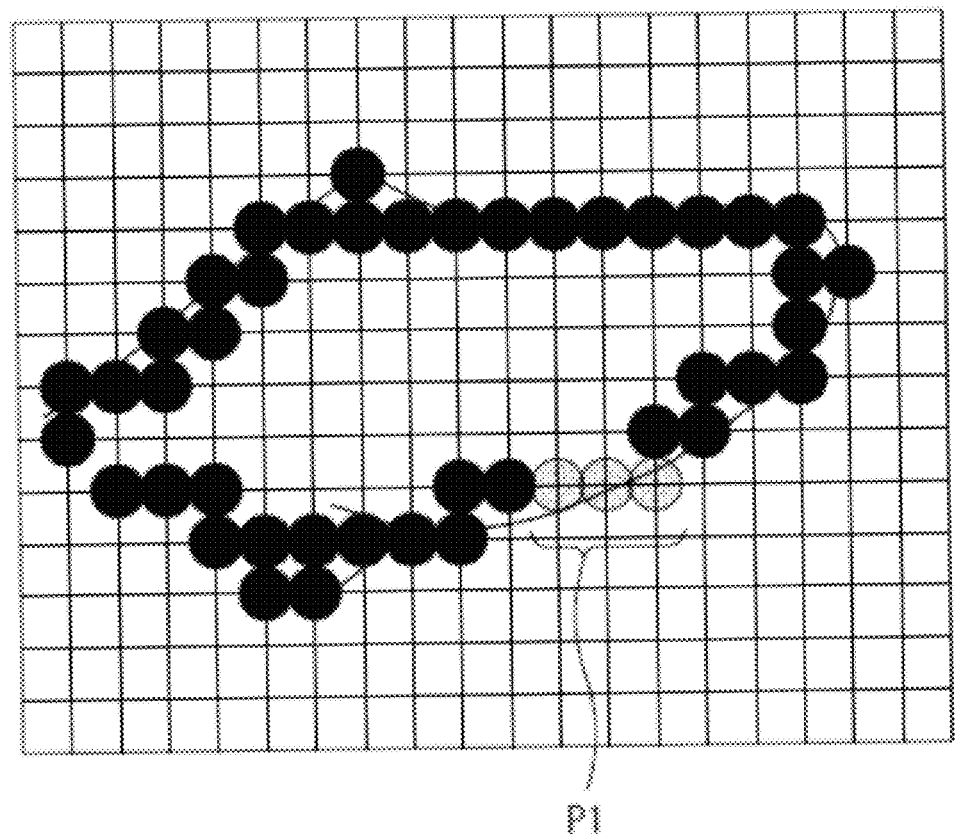
FIG. 8 is a diagram exemplifying a shape master in the information processing device as an example of the embodiment.

FIG. 6 is a diagram exemplifying the shape of the operation body on the touch panel 200 of the information processing device 1 as an example of the embodiment, and FIG. 7 is a diagram exemplifying a recognition result based on the contact shape determination processing unit 23 with respect to the operation body illustrated in FIG. 6. In addition, FIG. 8 is a diagram exemplifying a shape master in the information processing device 1 as an example of the embodiment.

In the example illustrated in FIG. 6, for the sake of convenience, the operation body (the left thumb of the user) is illustrated in a permeable state. In addition, FIG. 6 illustrates an example in which the contact sensor 113 is embedded in a grid-like pattern in the touch panel 200 and individual intersection points between grids function as recognition points for sensing contact. In addition, in FIG. 6, the illustration of the contact sensor 113 is omitted.

Based on sensing results caused by the individual recognition points on the touch panel 200, the contact shape determination processing unit 23 determines, for example, the contour shape of the aggregation of the recognition points. In other words, as illustrated in FIG. 7, the contact shape determination processing unit 23 recognizes, as the shape (contact body shape) of the contact body, the contour shape of the aggregation of recognition points at which contact in the touch panel 200 is recognized. In other words, a region surrounded by the recognition points is recognized to be the contact body shape. In addition, determination of the contour shape of the aggregation of the recognition points may be performed using various existing methods, and the description thereof will be omitted. In the example illustrated in FIG. 7, the contour shape of the contact body is illustrated by black circles on the intersection points between the grids.

In addition, the contact shape determination processing unit 23 compares this recognized contact body shape with the shape information (shape masters or specified shapes) of fingers (fingertips) of the user, preliminarily registered in the shape registration unit 24.

In a case of being used for an operation of the touch panel 200 in the present information processing device 1, the specified shapes (shape masters) are pieces of information indicating respective shapes of right and left thumbs or the like likely to touch the icons 201, and are each configured as the contour shape of the aggregation of recognition points as illustrated in FIG. 8, in the same way as the contact body shape illustrated in FIG. 7. The right and left thumbs or the like of the user of the information processing device 1 are brought into contact with the touch panel 200 by the user, and individually scanned, and thus, the specified shapes are registered.

In addition, in place of scan data of the user's own finger, a shape (reference data) of a usual thumb or the like may be used as the specified shape, and may be variously modified and implemented.

In addition, by individually registering data of right and left thumbs in this shape registration unit 24, it becomes possible to judge which of a right hand and a left hand the user operates using a finger of.

Here, in the shape registration unit 24, the direction of the shape of a thumb may be sensed, and processing for the icons 201 to be displayed and operated may be changed based on the direction. Instead of registering a plurality of shapes by registering contact body shapes of individual fingers, one thumb shape is registered as the specified shape. In addition, a scanned contact body shape may be compared with a shape obtained by subjecting the registered thumb shape to coordinate conversion, and from this, it is possible to reduce the capacity of the shape registration unit 24. In addition, by sensing the direction of the scanned contact body shape, it may be determined the icon 201 in which direction is to be operated.

In addition, the specified shape includes specified shape points P1. The specified shape points P1 are reference positions in the relevant specified shape, and the input control processing unit 41 described later measures a distance with one of the icons 201 on the display screen of the touch panel 200, based on the specified shape points P1.

The contact shape determination processing unit 23 compares the contact body shape acquired based on a sensing result of the contact sensor 113 with a preliminarily registered specified shape, and in a case where these shapes match each other or approximately match each other, the contact shape determination processing unit 23 informs the input control processing unit 41 to that effect. In addition, comparison in shape between the contact body shape and the specified shape may be performed using various existing methods, and the description thereof will be omitted.

As described above, the contact shape determination processing unit 23 does not calculate a contact area (surface region) between the operation body and the touch panel 200 or perform determination based on the contact area. In other words, the contact shape determination processing unit 23 performs determination using shape matching between the contact body shape acquired based on the contact sensor 113 and the specified shape, and the determination is not determination based on comparison of the contact area with, for example, a predetermined value.

In the present information processing device 1, the contact shape determination processing unit 23 compares the contact body shape with the specified shape stored in the shape registration unit 24, and performs determination of match or mismatch, based on the similarity of the shape.

The contact shape determination processing unit 23 notifies the display operation processing unit 30 of the shape and position (coordinates) of a specified shape (shape master) where it is determined that an input is sensed for the input control processing unit 41.

The input control processing unit 41 controls input processing for the relevant information processing device 1. If being notified by the push button processing unit 42 that, for example, an input based on one of the push buttons 104 has been performed, the input control processing unit 41 notifies the icon arrangement processing unit 31 in the display operation processing unit 30 described later of information indicating that such an input of the push button 104 has been performed.

With one of the three push buttons 104, arranged in the center thereof, the three push buttons 104 being arranged in the front surface of the present information processing device 1, processing for, for example, shifting to a home screen by an operation for pressing down the relevant push button 104 is associated.

Accordingly, if an input operation based on this push button 104 is performed, the input control processing unit 41 performs processing for, for example, notifying the display operation processing unit 30 of an instruction to display the home screen.

In addition, the input control processing unit 41 recognizes selection and determination of one of the icons 201 by the operation body, in the display screen of the touch panel 200, and gives notice to the display operation processing unit 30 described later.

Upon receiving, from the contact shape determination processing unit 23 with respect to a specified shape, the shape, the position (coordinates), and the specified shape points P1 thereof, the input control processing unit 41 gives notice to the display operation processing unit 30.

Furthermore, based on the contact body shape recognized by the contact shape determination processing unit 23, the input control processing unit 41 (element selection unit) selects a selection candidate icon (selection candidate element) 201 from among the icons 201 arranged on the display screen of the touch panel 200.

In accordance with an overlapping state between the contact body shape and one of the icons 201 in the display screen of the touch panel 200, the input control processing unit 41 performs various types of input control.

The input control processing unit 41 recognizes a state where, for example, the operation body is in contact with one of the icons 201 on the touch panel 200 in the display screen of the touch panel 200, in other words, a case where one of the icons 201 overlaps with the contact body shape, as a state in which the relevant icon 201 is selected. Hereinafter, in some cases, the selected icon 201 is called an icon to be selected 201a.

In addition, in a case where, for example, during a predetermined time period after the icon to be selected 201 is selected, the operation body becomes out of touch with the relevant icon to be selected 201a, the input control processing unit 41 recognizes that the input of that icon to be selected 201 is decided.

Furthermore, in a case where there are a number of icons 201 to serve as candidates for the icon to be selected 201 in such a manner as in a case where a number of icons 201 overlap with the contact body shape in the display screen of the touch panel 200, the input control processing unit 41 identifies an icon to be selected 201a, based on the above-mentioned specified shape points P1 of the contact body shape.

Hereinafter, in some cases, that the contact body shape (operation body) overlaps with the icon 201 is expressed as it that the operation body overhangs the icon 201. In addition, in some cases, one icon 201 out of the icons 201 displayed in the touch panel 200, which overlaps with the contact body shape, is called a touch icon 201.

Figure 9:
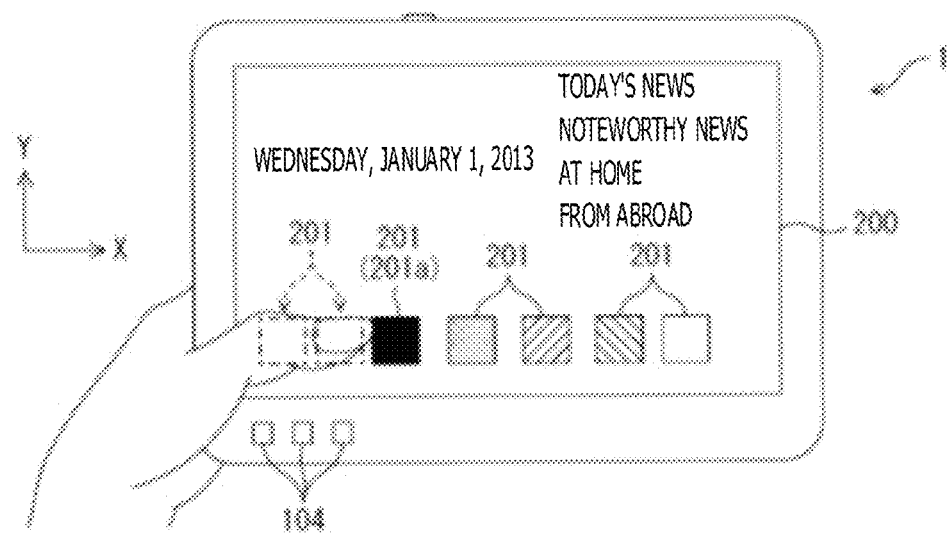
FIG. 9 is a diagram exemplifying an external appearance of the information processing device as an example of the embodiment.

FIG. 9 is a diagram exemplifying the external appearance of the information processing device 1 as an example of the embodiment, and illustrates a state in which the user holds the information processing device 1 with one hand.

In this example illustrated in FIG. 9, the seven icons 201 are lined up in the horizontal direction and displayed in the touch panel 200, and the thumb (operation body) of the left hand of the user overhangs the two icons 201 out of the seven icons 201, indicated by dashed lines on a far left side. In other words, the two icons 201 indicated by these dashed lines are the touch icons 201.

If there is one of the icons 201 that overlaps with, for example, the specified shape points P1 of the contact body shape in a case where the operation body (a finger of an operator) overhangs a number of icons 201, the input control processing unit 41 defines this icon 201 as the icon to be selected 201a. In addition, in a case where there are a number of icons 201 that overlap with the specified shape points P1, one of the icons 201, whose area overlapping with the specified shape points P1 is large, may be defined as the icon to be selected 201a, and variously modified implementation such as random selection may be adopted.

In addition, if there is no icon 201 that overlaps with the specified shape points P1 of the contact body shape in a case where the operation body overhangs a number of icons 201, the input control processing unit 41 defines one of the icons 201, closest to the specified shape points P1, as the icon to be selected (target icon) 201a.

In the example illustrated in FIG. 9, it is assumed that the specified shape points P1 of the contact body shape are set at positions corresponding to the leading end portion of the thumb of the left hand of the user. In such a case, one icon 201 out of the seven icons 201 lined up in the horizontal direction on the touch panel 200, the former icon 201 being the third from the far left and blacked out, is defined as the icon to be selected 201a.

Furthermore, in a case where the operation body overhangs none of the icons 201, the input control processing unit 41 may define one of the icons 201, closest to the specified shape points P1, as the icon to be selected 201a.

The input control processing unit 41 notifies the icon arrangement processing unit 31 in the display operation processing unit 30 described later of the selected icon to be selected 201a. In addition, at this time, the input control processing unit 41 notifies the icon arrangement processing unit 31 of touch icons 201 other than the icon to be selected 201a. The touch icons 201 other than the icon to be selected 201a correspond to elements to be selected, hidden by the contact body shape from among the icons (elements to be selected) 201.

In addition, unique identification information is preliminarily set for each icon 201, and the input control processing unit 41 gives notice of the icon 201 using, for example, this identification information.

The display operation processing unit 30 performs display control for the icons 201 or the like on the touch panel 200 and processing control of various kinds of inputs performed in the present information processing device 1. This display operation processing unit 30 includes the icon arrangement processing unit 31 and a software start-up processing unit 32.

Upon receiving, from the input control processing unit 41, a notice to the effect that the input of one of the icons 201 is decided, the software start-up processing unit 32 causes the CPU 115 to execute processing associated with the relevant icon 201.

In addition, upon receiving, from the input control processing unit 41, a notice to the effect that an input based on one of the push buttons 104 is performed, the software start-up processing unit 32 causes the CPU 115 to execute processing associated with the relevant push button 104.

The icon arrangement processing unit 31 performs control for displaying the icons 201 on the display screen of the touch panel 200.

In addition, upon being notified by the input control processing unit 41 of the icon to be selected 201a and the touch icons 201, the icon arrangement processing unit 31 non-displays, from the touch panel 200, touch icons 201 other than the icon to be selected 201a on the display screen of the touch panel 200. In other words, the icon arrangement processing unit 31 functions as a non-display processing unit that puts, into non-display, the touch icons 201 hidden by the operation body (contact body shape) from among the icons (elements to be selected) 201.

Furthermore, in the touch panel 200, the icon arrangement processing unit 31 causes a number of icons 201 including the icon to be selected 201a to be zoom-displayed in a display region on the display screen, the display region including the original regions of the touch icons 201 put into non-display. In other words, the icon arrangement processing unit 31 functions as a zoom-display unit that zoom-displays icons 201 different from the touch icons 201 put into non-display from among the icons 201.

In addition, the icon arrangement processing unit (arrangement processing unit) 31 arranges the zoom-displayed icon to be selected 201a under the contact body shape. From this, the icon arrangement processing unit 31 puts the relevant icon to be selected 201a into a state of being selected (a determination waiting state).

Figure 10:
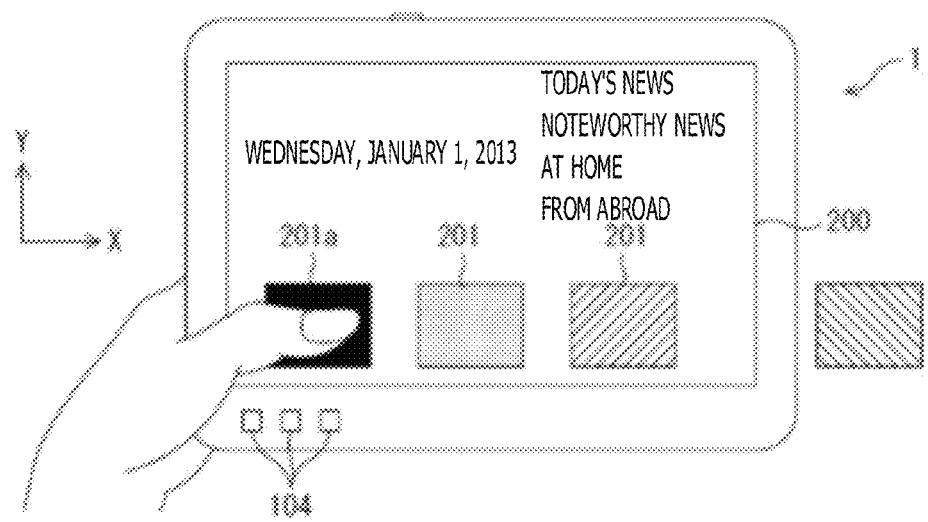
FIG. 10 is a diagram exemplifying the external appearance of the information processing device as an example of the embodiment.

FIG. 10 is a diagram exemplifying the external appearance of the information processing device 1 as an example of the embodiment, and illustrates an example in which the icon to be selected 201a is shifted from a state exemplified in FIG. 9 to the determination waiting state.

The icon arrangement processing unit 31 puts touch icons 201 other than the icon to be selected 201a into non-display, from, for example, the state illustrated in FIG. 9. In addition, using regions (the original regions) in which these touch icons 201 put into non-display existed, the icon arrangement processing unit 31 causes the icon to be selected 201a and one or more icons 201 located around the icon to be selected 201a to be zoom-displayed. Furthermore, the icon arrangement processing unit 31 arranges the icon to be selected 201a out of the zoom-displayed icons 201, at a position overlapping with the operation body. From this, the icon to be selected 201a is put into the determination waiting state.

In this way, the icon arrangement processing unit 31 changes display from a state in which the icons 201 before the zoom-display are arranged as illustrated in FIG. 9 to a state in which some icons 201 are zoom-displayed as illustrated in FIG. 10.

In addition, hereinafter, in some case, a display screen before the icons 201 are zoom-displayed as illustrated in FIG. 9 is called a before-icon-zoom-display screen and a display screen after some icons 201 are zoom-displayed as illustrated in FIG. 10 is called an after-icon-zoom-display screen.

In addition, in the after-icon-zoom-display screen, the number of displays of zoom-displayed icons 201, the size of the icon 201 after zoom, and so forth may be arbitrarily changed, and may be preliminarily set by, for example, the user. In the example illustrated in FIG. 10, the three icons 201 (201a) after zoom are displayed.

In addition, at this time, in the display screen of the touch panel 200, the arrangement of the individual icons 201, in other words, a positional relationship between the icons 201 lined up in the X-axis direction is not changed, and the icons 201 are arranged in the same manner as in the arrangement illustrated in FIG. 9.

From this, the icon arrangement processing unit 31 changes display, and thus, regions including the icon to be selected 201a and the icons 201 located thereabound (excluding the touch icons 201) are displayed as if being zoomed.

In this way, the icon arrangement processing unit 31 arranges the icon to be selected 201a while aligning the icon to be selected 201a with the position of the operation body on the touch panel 200, and arranges the icons 201 in the same manner as in the arrangement illustrated in FIG. 9, based on this icon to be selected 201a, while not changing a positional relationship between a before-zoom-display screen and the arrangement of the individual icons 201, in other words, between the icons 201 lined up in the X-axis direction.

In addition, upon receiving, from the acceleration information processing unit 21, an acceleration direction along with information to the effect that acceleration is sensed, in a state of causing the icons 201 other than the touch icons 201 to be zoom-displayed, the icon arrangement processing unit 31 changes the arrangement of the icons 201 on the display screen of the touch panel 200, in accordance with the acceleration direction.

Figure 11A:
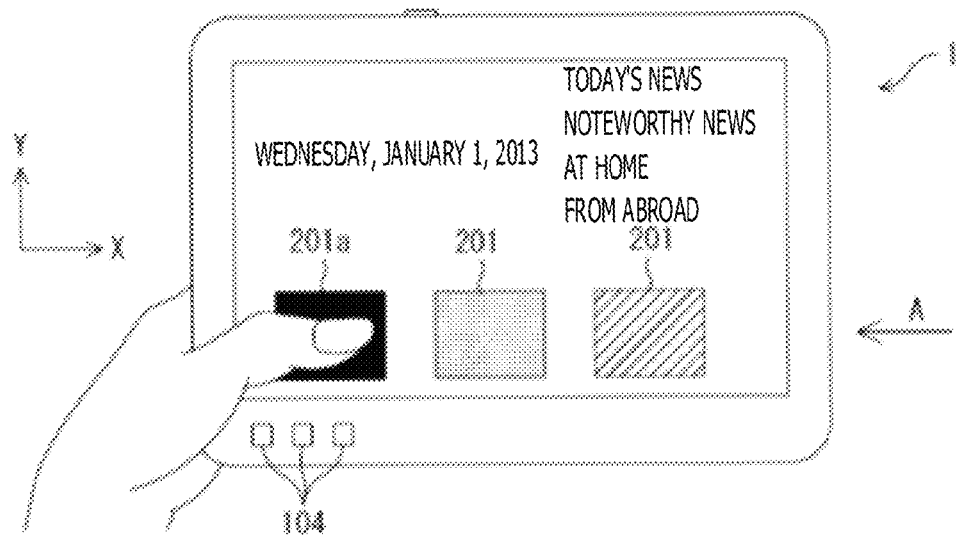
FIG. 11A is a diagram for explaining an arrangement method for icons, based on an icon arrangement processing unit in the information processing device as an example of the embodiment.
Figure 11B:
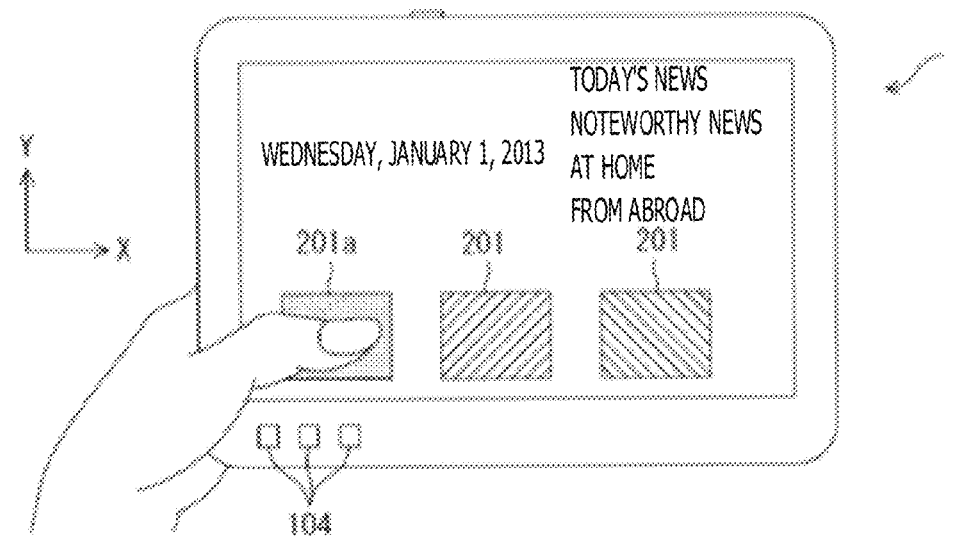
FIG. 11B is a diagram for explaining the arrangement method for icons, based on the icon arrangement processing unit in the information processing device as an example of the embodiment.

Each of FIG. 11A and FIG. 11B is a diagram for explaining an arrangement method for icons, based on the icon arrangement processing unit 31 in the information processing device 1 as an example of the embodiment, FIG. 11A is a diagram exemplifying a state before the arrangement thereof is changed, and FIG. 11B is a diagram exemplifying a state after the arrangement thereof is changed.

In the example illustrated in FIG. 11A, three zoom-displayed icons 201 are arranged on the display screen of the touch panel 200. From among these three icons 201, an icon 201 at the far left is arranged, as the icon to be selected 201a, so as to be laid under the thumb of the left hand of the user, and is put into a selection state.

In this state illustrated in FIG. 11A, the user instantaneously moves the information processing device 1 in, for example, the horizontal direction to the left side (the minus side in the X-axis direction) in such a manner as indicated by an arrow A in the drawing while holding the information processing device 1 with the left hand of the user. The acceleration sensor 112 senses this acceleration of the information processing device 1 in the arrow A direction, and transmits the acceleration to the acceleration information processing unit 21.

Upon sensing the acceleration of the relevant information processing device 1 in the X-axis direction or the Y-axis direction, greater than or equal to the threshold value, the acceleration information processing unit 21 notifies the icon arrangement processing unit 31 of an acceleration direction along with information to the effect that the acceleration is sensed.

Upon receiving, from the acceleration information processing unit 21, the acceleration direction along with the information to the effect that the acceleration is sensed, the icon arrangement processing unit 31 changes the arrangement of the icons 201 on the display screen of the touch panel 200 in accordance with the movement direction (acceleration direction) thereof, as illustrated in FIG. 11B.

Specifically, the individual icons 201 are arranged while being displaced by one on the display screen of the touch panel 200 in the acceleration direction. At this time, within the array of the icons 201, the icon to be selected 201a arranged in an end portion (at the far left in the example of FIG. 11A) in the relevant acceleration direction is non-displayed from the screen. In addition, within the array of the icons 201, in an end portion (at the far right in the example of FIG. 11A) in a direction opposite to the acceleration direction, next to the icon 201 in the end portion on a side opposite to the acceleration direction in an after-zoom-display screen in FIG. 11A, the icon 201 adjacent to the icon 201 in the relevant end portion in the before-icon-zoom-display screen illustrated in FIG. 9 is displayed.

In this way, in the display screen of the touch panel 200 in FIG. 11B after an arrangement change, by arranging the individual icons 201 in FIG. 11A before the arrangement change while displacing the individual icons 201 by one in the detected acceleration direction, the individual icons 201 are displayed in such a manner as being moved in the acceleration direction.

In addition, at the time of changing the arrangement of the icons 201 from the before-arrangement-change state to the after-arrangement-change state, the icon arrangement processing unit 31 may cause the displacement trajectories of the individual icons 201 to be displayed by animation in such a manner that the individual icons 201 move in the acceleration direction. In addition, at this time, the user may be notified by reproducing sound effects. From this, the user is able to recognize, by sound, switching of the icon to be selected 201a without visually confirming the display of the touch panel 200, and convenience is improved.

Furthermore, as illustrated in FIG. 11B, in the display screen of the touch panel 200 after the arrangement change, the icon 201 adjacent to the icon to be selected 201a in FIG. 11A before the arrangement change is arranged under the contact body shape (operation body). From this, this icon 201 is defined as a new icon to be selected 201a, and the relevant icon to be selected 201a is put into a state of being selected (the determination waiting state).

A display control method for the icons 201 in the information processing device 1 configured as described above as an example of the embodiment will be described with reference to FIG. 12A, FIG. 12B, and FIG. 12C.

Figure 12A:
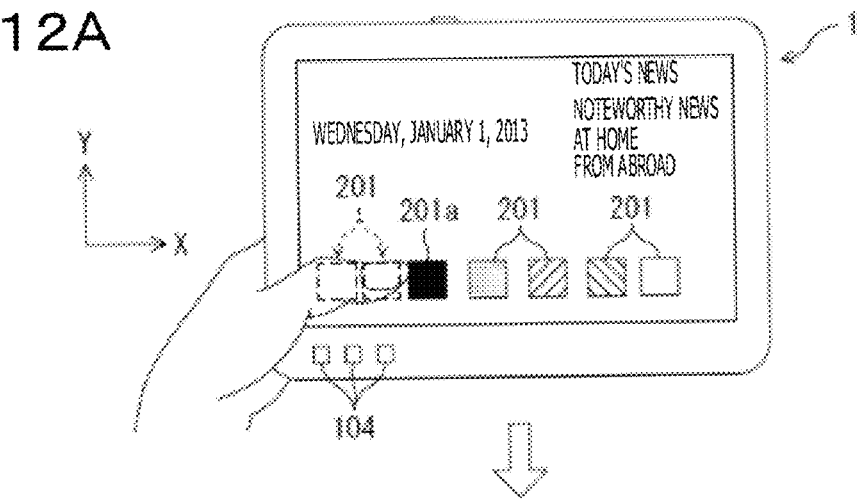
FIG. 12A is a diagram exemplifying a transition of icon display in a display screen of the touch panel of the information processing device as an example of the embodiment.
Figure 12B:
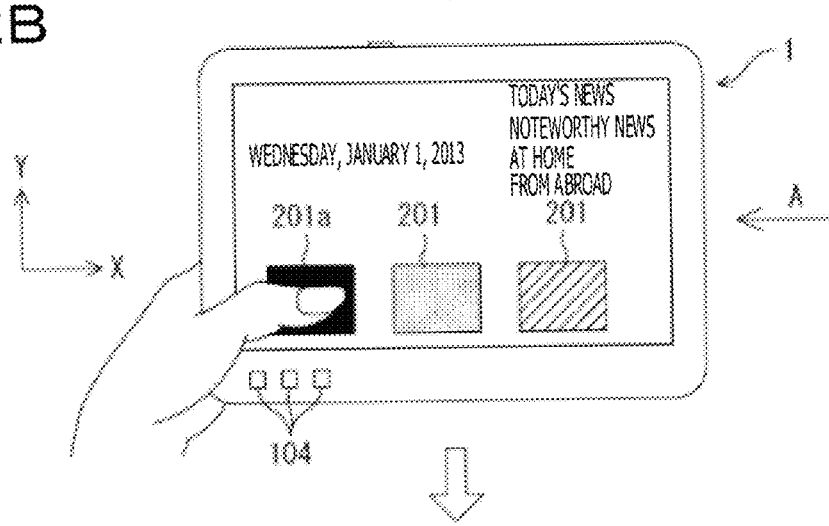
FIG. 12B is a diagram exemplifying a transition of icon display in the display screen of the touch panel of the information processing device as an example of the embodiment.
Figure 12C:
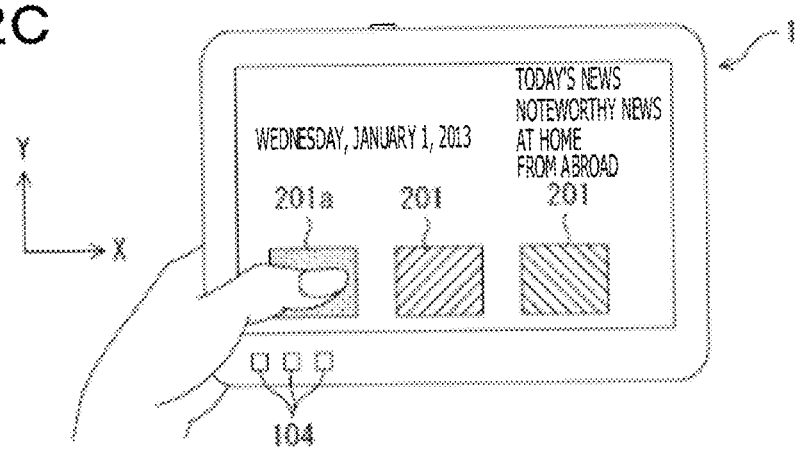
FIG. 12C is a diagram exemplifying a transition of icon display in the display screen of the touch panel of the information processing device as an example of the embodiment.

Each of FIG. 12A, FIG. 12B, and FIG. 12C is a diagram exemplifying the transition of icon display in the display screen of the touch panel 200 of the information processing device 1 as an example of the embodiment. FIG. 12A illustrates a state before icon zoom display, FIG. 12B illustrates a state after icon zoom, and FIG. 12C illustrates a state in which acceleration is sensed to a minus side in the X-axis direction in the state of FIG. 12B.

In other words, as exemplified in FIG. 12A, the user holds, with the left hand thereof, the information processing device 1 in which seven icons 201 are lined up and displayed in the horizontal direction in the touch panel 200. At this time, the thumb (operation body) of the left hand of the user overhangs the two icons 201 indicated by dashed lines on a far left side, from among the seven icons 201.

The contact sensor 113 senses the left hand thumb of the user on the touch panel 200, and the contact shape determination processing unit 23 recognizes, as the shape (contact body shape) of the contact body of the touch panel 200, the contour shape of the aggregation of recognition points at which contact in the touch panel 200 is recognized. The contact shape determination processing unit 23 compares this recognized contact body shape with the specified shape (shape master) of a finger of the user, preliminarily registered in the shape registration unit 24. In addition, in a case where these shapes match each other or approximately match each other, the contact shape determination processing unit 23 informs the input control processing unit 41 to that effect.

The input control processing unit 41 defines, as the icon to be selected 201a, one of the icons 201 that overlaps with the specified shape points P1 of the contact body shape or is located at a position closest thereto. In the example illustrated in FIG. 12A, one icon 201 out of the seven icons 201 lined up in the horizontal direction on the touch panel 200, the former icon 201 being the third from the far left and blacked out, is the icon to be selected 201a.

The input control processing unit 41 notifies the icon arrangement processing unit 31 in the display operation processing unit 30 of touch icons 201 and the icon to be selected 201a.

The icon arrangement processing unit 31 causes the display screen of the touch panel 200 to display an after-icon-zoom-display screen in which some icons 201 are zoom-displayed as illustrated in FIG. 12B.

In other words, the icon arrangement processing unit 31 non-displays, from the touch panel 200, touch icons 201 other than the icon to be selected 201a, within a number of icons 201 on the display screen of the touch panel 200. In addition, the icon arrangement processing unit 31 causes a number of icons 201 including the icon to be selected 201a to be zoom-displayed on the display screen of the touch icon 201, using the original regions of the touch icons 201 put into non-display.

In addition, by arranging the zoom-displayed icon to be selected 201a under the contact body shape, the icon arrangement processing unit 31 puts this icon to be selected 201a into a state of being selected (the determination waiting state).

Next, if the user instantaneously moves the information processing device 1 in, for example, the horizontal direction (the minus side in the X-axis direction) in such a manner as indicated by an arrow A in FIG. 12B while holding the information processing device 1 with the left hand of the user, the acceleration information processing unit 21 senses this acceleration of the information processing device 1 in the arrow A direction, and informs the icon arrangement processing unit 31 to that effect and of the acceleration direction.

As illustrated in FIG. 12C, in accordance with the sensed acceleration direction, the icon arrangement processing unit 31 arranges the icons 201 on the display screen of the touch panel 200 while displacing the individual icons 201 by one in the acceleration direction.

At this time, by displacing the individual icons 201 on the display screen of the touch panel 200 by one in the acceleration direction, the icon 201 serving as the icon to be selected 201a disappears off the touch panel 200. As alternated, at a position on a side opposite to the acceleration direction of one of the icons 201 displayed on the touch panel 200, one of the icons 201 adjacent to the relevant icon 201 in FIG. 12A is newly zoom-displayed.

In addition, one of the icons 201 located on the right side (a side opposite to the acceleration direction) of the previous icon to be selected 201a that disappears off the touch panel 200 becomes a new icon to be selected 201a, is arranged under the left hand thumb (operation body) of the user on the touch panel 200, and is put into the determination waiting state.

While, in the examples illustrated in FIG. 12A, FIG. 12B, and FIG. 12C, the transition of icon display in a case where the present information processing device 1 is moved in the X-axis direction (horizontal direction) is illustrated, the transition of icon display is not limited to this, and may be variously modified and implemented.

Hereinafter, the transition of icon display in a case where the present information processing device 1 is moved in the Y-axis direction (vertical direction) will be described with reference to FIG. 13A, FIG. 13B, and FIG. 13C.

Figure 13A:
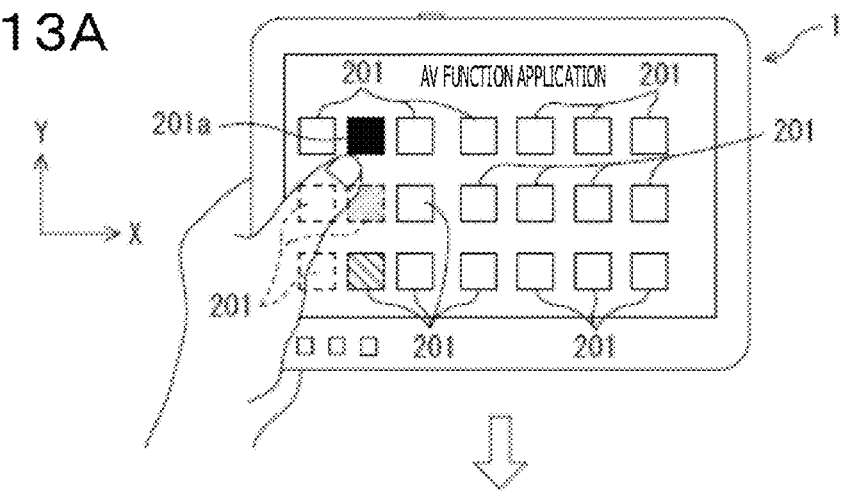
FIG. 13A is a diagram exemplifying a transition of icon display in the display screen of the touch panel of the information processing device as an example of the embodiment.
Figure 13B:
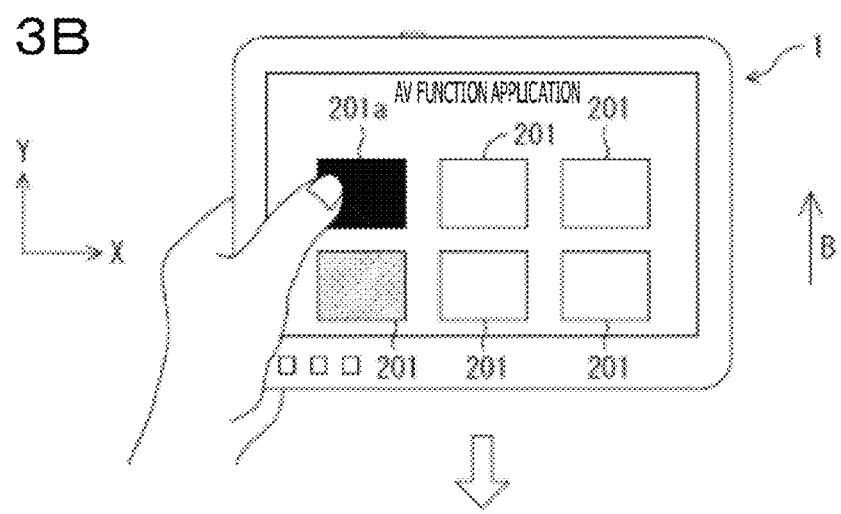
FIG. 13B is a diagram exemplifying a transition of icon display in the display screen of the touch panel of the information processing device as an example of the embodiment.
Figure 13C:
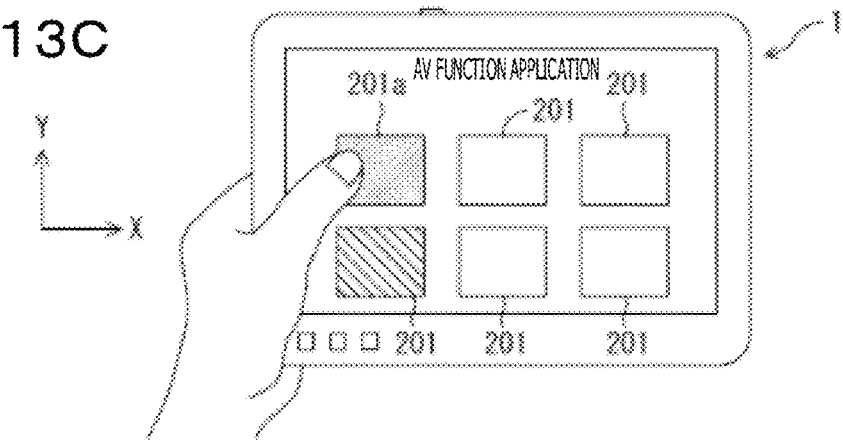
FIG. 13C is a diagram exemplifying a transition of icon display in the display screen of the touch panel of the information processing device as an example of the embodiment.

Each of FIG. 13A, FIG. 13B, and FIG. 13C is a diagram exemplifying the transition of icon display in the display screen of the touch panel 200 of the information processing device 1 as an example of the embodiment. FIG. 13A illustrates a state before icon zoom display, FIG. 13B illustrates a state after icon zoom, and FIG. 13C illustrates a state in which acceleration is sensed to a plus side in the Y-axis direction in the state of FIG. 13B.

In the example illustrated in FIG. 13A, in the touch panel 200, 21 icons 201 of 3 rows×7 columns are arranged and displayed.

The user holds the information processing device 1 with the left hand thereof. From this, the thumb (operation body) of the left hand of the user overhangs the three icons 201 indicated by dashed lines on a far left side, from among the 21 icons 201. In other words, the three icons 201 indicated by these dashed lines are the touch icons 201.

The contact sensor 113 senses the left hand thumb of the user on the touch panel 200, and the contact shape determination processing unit 23 recognizes, as the shape (contact body shape) of the contact body of the touch panel 200, the contour shape of the aggregation of recognition points at which contact in the touch panel 200 is recognized. The contact shape determination processing unit 23 compares this recognized contact body shape with the specified shape (shape master) of the user, preliminarily registered in the shape registration unit 24. In addition, in a case where these shapes match each other or approximately match each other, the contact shape determination processing unit 23 informs the input control processing unit 41 to that effect.

The input control processing unit 41 defines, as the icon to be selected 201a, one of the icons 201 that overlaps with the specified shape points P1 of the contact body shape or is located at a position closest thereto. In the example illustrated in FIG. 13A, one of the icons 201, located in an upper left portion of the touch panel 200 and blacked out, is the icon to be selected 201a.

The input control processing unit 41 notifies the icon arrangement processing unit 31 in the display operation processing unit 30 of touch icons 201 and the icon to be selected 201a.

The icon arrangement processing unit 31 causes the display screen of the touch panel 200 to display an after-icon-zoom-display screen in which some icons 201 are zoom-displayed as illustrated in FIG. 13B. In the example illustrated in FIG. 13B, six icons 201 including the icon to be selected 201a are zoom-displayed on the display screen of the touch panel 200.

In other words, from a state illustrated in, for example, FIG. 12A, the icon arrangement processing unit 31 causes only the icon to be selected 201a and icons 201 located around the icon to be selected 201a to be zoom-displayed, and puts icons 201 other than those into non-display.

The icon arrangement processing unit 31 arranges the zoom-displayed icon to be selected 201a at a position overlapping with the operation body, and causes the touch panel 200 to display, from among icons 201 located around this icon to be selected 201a, only icons 201 able to be displayed within the display screen of the touch panel 200 in a state of being zoom-displayed.

At this time, from among the touch icons 201, touch icons 201 other than touch icons 201 lined up in the same row or the same column as that of the icon to be selected 201a are put into non-display. On the display screen of the touch panel 200, the icon arrangement processing unit 31 causes other icons 201 including the icon to be selected 201a to be zoom-displayed, using the original regions of the touch icons 201 put into non-display.

The icon arrangement processing unit 31 arranges the icon to be selected 201a while aligning the icon to be selected 201a with the position of the operation body on the touch panel 200, and arranges the icons 201 in the same manner as in the arrangement illustrated in FIG. 13A, based on this icon to be selected 201a, while not changing a positional relationship between a before-zoom-display screen and the arrangement of the individual icons 201, in other words, between a number of icons 201 lined up in the X-axis direction and the Y-axis direction.

In addition, by arranging the zoom-displayed icon to be selected 201a under the contact body shape, the icon arrangement processing unit 31 puts this icon to be selected 201a into a state of being selected (the determination waiting state).

From this, the icon arrangement processing unit 31 changes display, and thus, regions including the icon to be selected 201a and the icons 201 located therearound (excluding the touch icons 201) are displayed as if being zoomed.

Next, if the user instantaneously moves the information processing device 1 in, for example, an upper direction (the plus side in the Y-axis direction) in such a manner as indicated by an arrow B in FIG. 13B while holding the information processing device 1 with the left hand of the user, the acceleration information processing unit 21 senses this acceleration of the information processing device 1 in the arrow B direction, and informs the icon arrangement processing unit 31 to that effect and of the acceleration direction.

As illustrated in FIG. 13C, in accordance with the sensed acceleration direction, the icon arrangement processing unit 31 arranges the individual icons 201 on the display screen of the touch panel 200 while displacing the individual icons 201 by one in the acceleration direction.

A this time, by displacing the individual icons 201 on the display screen of the touch panel 200 by one in the acceleration direction, the icon 201 serving as the icon to be selected 201a and icons 201 lined up in the same row as that of the relevant icon 201 disappear off the touch panel 200. As alternated, at positions on a side opposite to the acceleration direction of one of the icons 201 displayed on the touch panel 200, one of the icons 201 adjacent to the relevant icon 201 in FIG. 13A and icons 201 lined up in the same row as that of the relevant icon 201 are newly zoom-displayed.

In addition, one of the icons 201 located on a side opposite to the acceleration direction (a lower side in the drawing) of the previous icon to be selected 201a that disappears off the touch panel 200 becomes a new icon to be selected 201a, is arranged under the left hand thumb (operation body) of the user on the touch panel 200, and is put into the determination waiting state.

Figure 14:
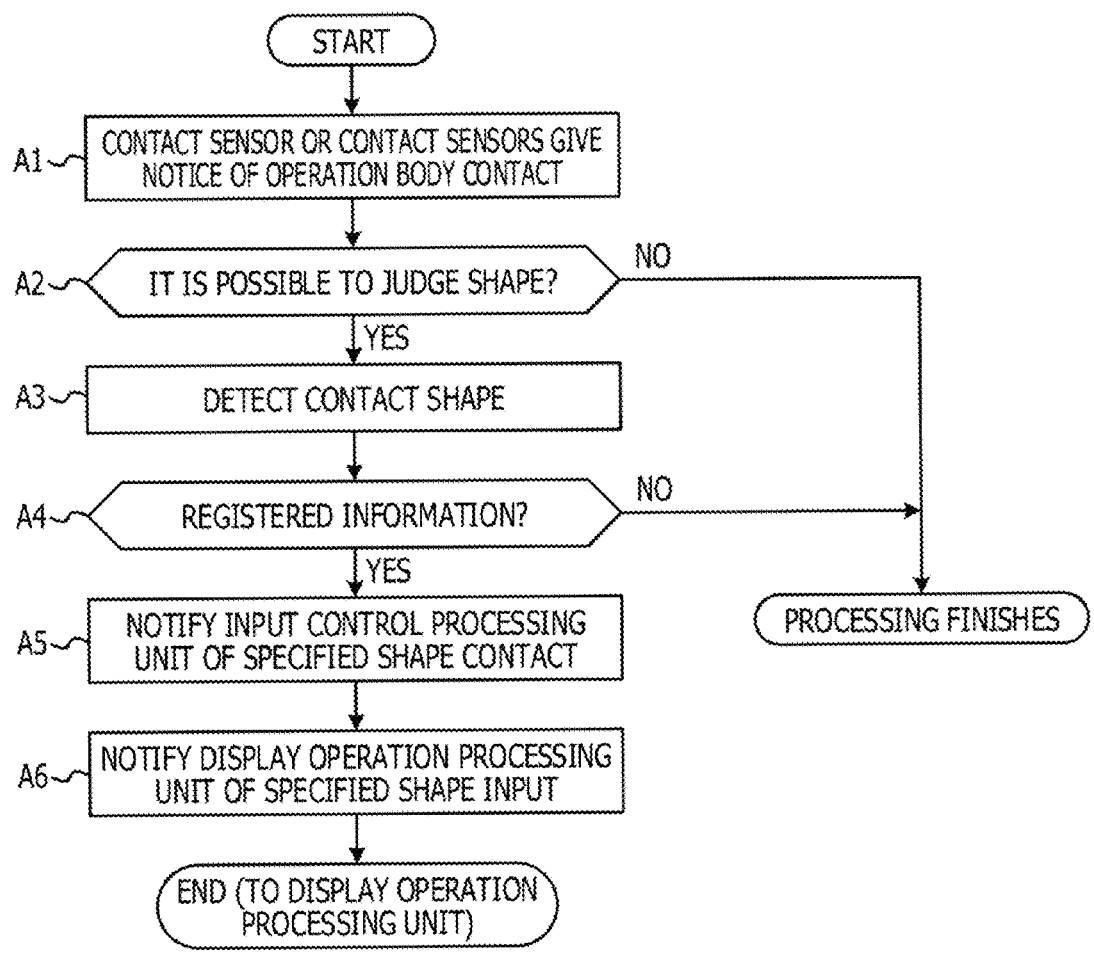
FIG. 14 is a flowchart explaining processing in an information processing determination unit in the information processing device as an example of the embodiment.

Next, processing in the information processing determination unit 20 in the information processing device 1 as an example of the embodiment will be described in accordance with a flowchart (steps A1 to A6) illustrated in FIG. 14.

If the operation body (thumb) of the user makes contact with the touch panel 200 of the present information processing device 1, the contact sensor 113 senses it, and notifies the information processing determination unit 20 of a contact sensing result of a single point or a plurality of points (step A1).

In the information processing determination unit 20, the contact sensing result processing unit 22 receives the contact sensing result from the contact sensor 113, and starts processing. The contact sensing result processing unit 22 notifies the contact shape determination processing unit 23 of the contact sensing result.

In the step A2, based on the contact sensing result given notice of, the contact shape determination processing unit 23 determines whether or not it is possible to judge as the contact body shape. As a result of this determination, in a case in which it is difficult to judge a contact shape (see a No route in the step A2), the processing is terminated. For example, since it is difficult to judge as the contact shape in a case where the number of points of contact is one, the processing is terminated.

In a case where it is possible to judge the contact sensing result as the contact body shape (see a YES route in the step A2), the contact shape determination processing unit 23 recognizes, as the contact body shape, the contour shape of the aggregation of recognition points at which contact in the touch panel 200 is recognized, in the step A3.

In the step A4, the contact shape determination processing unit 23 compares the recognized contact body shape with a specified shape registered in the shape registration unit 24, and determines whether the contact body shape is a registered shape. In a case where the contact body shape is not a registered shape (see a NO route in the step A4), the processing is terminated.

In a case where the contact body shape is a registered shape (see a YES route in the step A4), the contact shape determination processing unit 23 notifies the input control processing unit 41 of being specified shape contact, in other words, specified contact based on the operation body such as a thumb (operation body contact), in the step A5.

In the step A6, for the display operation processing unit 30, the input control processing unit 41 notifies the display operation processing unit 30 of information that relates to a specified shape and is received from the contact shape determination processing unit 23. In other words, the input control processing unit 41 notifies the display operation processing unit 30 of the shape of a specified shape, and the coordinate information of the relevant specified shape and the information of the specified shape points P1 in a case where the specified shape is arranged at a contact body position, and terminates the processing. After that, the processing shifts to processing based on the display operation processing unit 30 and illustrated in FIG. 15.

Next, a flow processed by the display operation processing unit in the information processing device 1 as an example of the embodiment will be described in accordance with a flowchart (steps B1 to B10) illustrated in FIG. 15.

In the step B1, the display operation processing unit 30 recognizes the coordinates of the specified shape, given notice of by the input control processing unit 41, and the coordinate range of each icon 201 displayed in the display screen of the touch panel 200.

In the step B2, the display operation processing unit 30 confirms whether or not the specified shape and one of the icons 201 are in contact with each other. In other words, the display operation processing unit 30 confirms whether or not the relevant icon 201 is included in (overhangs) a shape range (specified shape coordinate range) in which the specified shape is confirmed.

In a case where the specified shape and the relevant icon 201 are not in contact with each other (see a NO route in the step B2), the display operation processing unit 30 recognizes, as the icon to be selected 201*a*, one of the icons 201, closest to the specified shape points P1 of the specified shape, in the step B3.

On the other hand, in a case where the specified shape and one or more icons 201 are in contact with each other (see a YES route in the step B2), the display operation processing unit 30 selects and recognizes the icon to be selected 201*a* from among the icons 201 in contact with this specified shape.

In other words, in a case where the specified shape and a number of icons 201 are in contact with each other, the display operation processing unit 30 recognizes, as the icon to be selected 201*a*, one of the icons 201, closest to the specified shape points P1, from among these icons 201 in contact with the specified shape. At this time, in a case where there is an icon 201 overlapping with the specified shape points P1, this overlapping icon 201 is defined as the icon to be selected 201*a*. In addition, in a case where the specified shape and one icon 201 are in contact with each other, the display operation processing unit 30 recognizes the icon 201 in contact with the specified shape, as the icon to be selected 201*a*.

In addition, in a case where only one icon 201 is in contact with the specified shape, some kind of notification control for clearly specifying, for the user, that the icon 201 is in contact with the operation body may be performed. Control for changing, for example, the display color, shape, size, or the like of the icon 201 may be performed, and notification may be performed using a sound or a vibrator not illustrated.

After that, in the step B5, the icon arrangement processing unit 31 non-displays, from the display screen of the touch panel 200, touch icons 201 other than the icon to be selected 201*a*. In other words, from among the touch icons 201 in contact with the specified shape coordinate range, the touch icons 201 other than the icon to be selected 201*a* are put into non-display.

In the step B6, on the display screen of the touch panel 200, the icon arrangement processing unit 31 causes other icons 201 including the icon to be selected 201*a* and not including the touch icons 201 to be zoom-displayed, using the original regions of the touch icons 201 put into non-display. By putting the touch icons 201 into non-display in the step B5, it is possible to secure a space for zoom-displaying other icons 201, on the display screen of the touch panel 200. In other words, it is possible to zoom icons 201 using spaces in which the touch icons 201 put into non-display existed.

In addition, the icon arrangement processing unit 31 arranges the icon to be selected 201*a* at a position overlapping with the operation body. From this, this icon to be selected 201*a* is put into the determination waiting state.

In the step B7, with respect to the icon to be selected 201*a* in the determination waiting state, the input control processing unit 41 senses whether or not the operation body moves away from the relevant icon to be selected 201 (is put into a non-contact state) (sensing of no contact).

In a case where it is not sensed that the operation body moves away from the icon to be selected 201 (see a NO route in the step B7), the acceleration information processing unit 21 determines, in the step B8, whether or not the acceleration of the present information processing device 1 is sensed (sensing of acceleration).

In a case where the acceleration information processing unit 21 senses the acceleration, based on a signal from the acceleration sensor 112 (see a YES route in the step B8), the icon arrangement processing unit 31 changes, in the step B9, the arrangement of the icons 201 on the display screen of the touch panel 200 in accordance with the acceleration direction thereof. In other words, by changing the arrangement while displacing the individual icons 201 zoom-displayed in the display screen of the touch panel 200 by one in the detected acceleration direction, the icon arrangement processing unit 31 displays the individual icons 201 in such a manner that the individual icons 201 are moved in the acceleration direction. In addition, the icon arrangement processing unit 31 arranges, under the operation body, one of the icons 201, adjacent to the icon to be selected 201*a* on a side opposite to the acceleration direction before the change of the arrangement. From this, this icon 201 is defined as a new icon to be selected 201*a*, and the relevant icon to be selected 201*a* is put into a state of being selected (the determination waiting state).

In other words, if acceleration is detected by the acceleration information processing unit 21 in a state in which the operation body is in contact with the icon to be selected 201*a*, the icon arrangement processing unit 31 sets, as a subsequent icon to be selected 201a, a subsequent icon 201 adjacent to the icon to be selected 201a on a side opposite to the acceleration direction. In addition, the icon arrangement processing unit 31 changes an icon arrangement so as to cause this subsequent icon to be selected 201a to be located in the specified shape coordinate range.

After that, the processing returns to the step B7. In addition, in a case where the acceleration information processing unit 21 does not sense acceleration, based on the signal from the acceleration sensor 112 (see a NO route in the step B8), the processing returns to the step B7.

In the step B7, in a case of sensing that the operation body moves away from the icon to be selected 201 (see a YES route in the step B7), the input control processing unit 41 gives notice to the software start-up processing unit 32. The software start-up processing unit 32, which has received, from the input control processing unit 41, a notice to the effect that determination of an input of one of the icons 201 has been performed, starts up a program (icon software) associated with the relevant icon 201, in the step B10, and terminates the processing. In other words, upon the start-up of the program associated with this icon 201, the size change and the arrangement change of icons 201, performed in the steps B5, B6, and B9, are cancelled, and normal display and operation return.

In this way, according to the information processing device 1 as an example of the embodiment, in a case where a number of icons 201 are simultaneously selected by the operation body such as a finger of the user in the display screen of the touch panel 200, the icon to be selected 201a and one or more icons 201 located around the icon to be selected 201a are zoom-displayed. From this, it becomes easy for the user to select the icons 201, and it is possible to suppress erroneous selection of the icons 201.

At this time, by putting, into non-display, touch icons 201 other than the icon to be selected 201a from among a number of icons 201 selected by the operation body, it is possible to secure a region for causing other icons 201 including the icon to be selected 201a to be zoom-displayed, using the original regions of the touch icons 201 put into non-display.

In addition, in this after-zoom-display screen, the individual icons 201 are arranged, based on this icon to be selected 201a, so as to be arranged in the same way while not changing a positional relationship between the before-zoom-display screen and the arrangement of the individual icons 201, in other words, between a number of icons 201 lined up in the X-axis direction and the Y-axis direction. In other words, between the after-zoom-display screen and the before-zoom-display screen, an icon arrangement design is not changed. From this, if icon arrangement is regarded as the design of a device, that design is not changed, and a sense of unity or the like is not hurt.

Furthermore, the icon arrangement processing unit 31 arranges the zoom-displayed icon to be selected 201a under a finger (operation body) of the user, on the display screen of the touch panel 200, and puts the icon to be selected 201a into the determination waiting state. From this, by just moving the operation body away from the icon to be selected 201a, the user is able to determine an input of the relevant icon to be selected 201a and is able to easily and correctly perform the determined input of the icon 201, and convenience is improved.

In addition, if the user performs an operation for applying acceleration to the present information processing device 1 in a state in which the operation body is in contact with the icon to be selected 201a and a zoom-displayed erroneous screen is displayed, the acceleration information processing unit 21 detects the acceleration, and the icon arrangement processing unit 31 performs an arrangement change while displacing the individual icons 201 by one in the detected acceleration direction.

From this, the user is able to change the icon to be selected 201a while holding the present information processing device 1, in other words, without moving a finger away from the touch panel 200, and convenience is improved. In particular, the user moves the individual icons 201 by one on the touch panel 200 in a direction in which the user assigns the acceleration to the present information processing device 1, and thus, it is possible to intuitively perform an operation for switching the icon to be selected 201a or the like.

In addition, based on the coordinate information given notice of by the contact sensing result processing unit 22, the contact shape determination processing unit 23 recognizes the contact body shape in the touch panel 200, and compares the recognized contact body shape with the shape information registered in the shape registration unit 24. In addition, a characteristic is that, in a case of matching the shape information as a result of this comparison, the icon to be selected 201a is selected from among a number of icons 201 on the display screen of the touch panel 200, using the specified shape points P1 included in specified information.

From this, it is possible to efficiently select the matching icon to be selected 201a for the operation body such as a finger of the user, and convenience is improved.

According to the present information processing device 1, at the time of selecting and determining the icon 201 in a state in which the present device is hold with one hand while the present device is not operated with a specific way to hold or in a specific posture, it is possible to suppress the occurrence of an erroneous operation. In addition, in the same way as a method of the related art, it is possible to select and determine individual icons 201 one by one using the operation body, and convenience is improved without greatly reducing the operability of the method of the related art.

In addition, the disclosed technology is not limited to the above-mentioned embodiments, and may be variously modified and implemented without departing from the scope of the present embodiments.

While, in the above-mentioned embodiments, as illustrated in FIGS. 12A to 12C or FIGS. 13A to 13C, an example in which acceleration is applied to the present information processing device 1 in the X-axis direction or the Y-axis direction and the icons 201 are moved and displayed in the acceleration direction is illustrated, the disclosed technology is not limited to this.

As illustrated in, for example, FIG. 13A, in a case where a number of icons 201 are arranged in a matrix in the X-axis direction and the Y-axis direction in the touch panel 200, acceleration may be applied to the present information processing device 1 in an oblique direction. In such a case, in other words, in a case where acceleration is applied in a direction relating to both the X-axis direction and the Y-axis direction, the icons 201 may be moved and displayed in the oblique direction in the acceleration direction, and variously modified implementations may be adopted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An input device including a display screen and a touch panel disposed on the display screen, the display screen configured to display a plurality of elements, the input device comprising:
   a memory; and
   a processor coupled to the memory and configured to cause performance of operations comprising:
   detecting an area contacted by a contact body on the touch panel,
   executing a comparison process that compares the area with master shape data of a master shape,
   when it is determined that the area matches the master shape based on the comparison process, specifying a first element and a second element included in the plurality of elements based on the area, the first element being displayed in a first region on the display device, and the second element being displayed in a second region on the display device that overlaps with the area,
   identifying the first element as a target element based on a positional relationship between the first region and the area,
   identifying the second element as a non-display element based on the second region overlapping the area,
   based on the second element being identified as the non-display element, deleting the second element from the second region of the display screen, and
   based on the first element being identified as the target element, enlarging the first element on the display screen using the second region.

2. The input device according to claim 1, wherein the operations further comprise:
   selecting, using reference position information read from the master shape data stored in a storage device, the first element closest to a position indicated by the reference position information from among the plurality of elements to be selected on the display screen.

3. The input device according to claim 1, wherein the operations further comprise:
   putting the enlarged first element into a determination waiting state by arranging the enlarged first element under the contact body.

4. The input device according to claim 3, further comprising: an acceleration direction sensing unit configured to sense an acceleration direction applied to the input device, wherein the operations further comprise moving the first element on the display screen in the acceleration direction.

5. A display control method comprising:
   displaying a plurality of elements to be selected in a display screen of a touch panel;
   detecting an area contacted by a contact body on the touch panel;
   executing a comparison process that compares the area with master shape data of a master shape;
   when it is determined that the area matches the master shape based on the comparison process, specifying a first element and a second element included in the plurality of elements based on the area, the first element being displayed in a first region on the display screen, and the second element being displayed in a second region on the display screen that overlaps with the area;
   identifying the first element as a target element based on a positional relationship between the first region and the area;
   identifying the second element as a non-display element based on the second region overlapping the area;
   based on the second element being identified as the non-display element deleting the second element from the second region of the display screen; and
   based on the first element being identified as the target element enlarging the first element on the display screen using the second region.

6. The display control method according to claim 5, further comprising:
   selecting, using reference position information read from the master shape data stored in a storage device, the first element closest to a position indicated by the reference position information from among the plurality of elements on the display screen.

7. The display control method according to claim 5, further comprising:
   putting the enlarged first element into a determination waiting state by arranging the enlarged first element to be selected under the contact body.

8. The display control method according to claim 7, further comprising:
   sensing an acceleration direction applied to an input device that includes the display screen and the touch panel; and
   moving the first element on the display screen in the acceleration direction.

9. A non-transitory machine readable medium storing a program that, when executed by a processor, causes a system to perform operations comprising:
   displaying a plurality of elements to be selected in a display screen of a touch panel;
   detecting an area contacted by a contact body on the touch panel;
   executing a comparison process which compares the area with master shape data of a master shape;
   when it is determined that the area matches the master shape based on the comparison process, specifying a first element and a second element included in the plurality of elements based on the area, the first element being displayed in a first region on the display screen, and the second element being displayed in a second region on the display screen that overlaps with the area;
   identifying the first element as a target element based on a positional relationship between the first region and the area;
   identifying the second element as a non-display element based on the second region overlapping the area;
   based on the second element being identified as the non-display element, deleting the second element from the second region of the display screen; and
   based on the first element being identified as the target element enlarging the first element on the display screen using the second region.

10. The non-transitory machine readable medium storing a program according to claim 9, the operations further comprising:
    selecting, using reference position information read from the master shape data preliminarily stored in a storage device, the first element to be selected closest to a position indicated by the reference position information from among the plurality of elements on the display screen, as a selection candidate element, based on the contact body shape in the display body.

11. The non-transitory machine readable medium storing a program according to claim 9, the operations further comprising:

putting the enlarged first element into a determination waiting state by arranging the enlarged first zoom displayed element to be selected the under the contact body.

12. The non-transitory machine readable medium storing a program according to claim 11, the operations further comprising:

sensing an acceleration direction applied to an input device that includes the display screen and the touch panel; and moving the first element on the display screen in the acceleration direction.

13. An integrated circuit device comprising:

a memory; and a processor coupled to the memory, configured to cause performance of operations comprising:

displaying a plurality of elements to be selected in a display screen of a touch panel;

detecting an area contacted by a contact body on the touch panel;

executing a comparison process which compares the area with master shape data of a master shape;

when it is determined that the area matches the master shape based on the comparison process, specifying a first element and a second element included in the plurality of elements based on the area, the first element being displayed in a first region on the display screen, and the second element being displayed in a second region on the display screen that overlaps with the area;

identifying the first element as a target element based on a positional relationship between the first region and the area;

identifying the second element as a non-display element based on the second region overlapping the area;

based on the second element being identified as the non-display element, deleting the second element from the second region of the display screen; and based on the first element being identified as the target element, enlarging the first element on the display screen using the second region.

14. The integrated circuit device according to claim 13, wherein the operations further comprise:

selecting, using reference position information read from the master shape data stored in a storage device, the first element closest to a position indicated by the reference position information from among the plurality of elements on the display screen.

15. The integrated circuit device according to claim 13, wherein the operations further comprise:

putting the enlarged first element into a determination waiting state by arranging the enlarged first element under the contact body.

16. The integrated circuit device according to claim 15, wherein the operations further comprise sensing an acceleration direction applied to an input device that includes the display screen and the touch panel, and moving the first element on the display screen in the acceleration direction.

\* \* \* \* \*